US009644752B2

(12) United States Patent
Nabors et al.

(10) Patent No.: US 9,644,752 B2
(45) Date of Patent: May 9, 2017

(54) ADJUSTABLE TRUNNION VALVE AND RELATED METHODS

(71) Applicant: Flowserve Management Company, Irving, TX (US)

(72) Inventors: Blake Nabors, Cookeville, TN (US); Donald Prince, Cookeville, TN (US); Anthony Majka, Cookeville, TN (US)

(73) Assignee: Flowserve Management Company, Irving, TX (US)

( * ) Notice: Subject to any disclaimer, the term of this patent is extended or adjusted under 35 U.S.C. 154(b) by 17 days.

(21) Appl. No.: 14/644,089

(22) Filed: Mar. 10, 2015

(65) Prior Publication Data

US 2016/0265670 A1    Sep. 15, 2016

(51) Int. Cl.
*F16K 5/06*   (2006.01)
*F16K 27/06*   (2006.01)

(52) U.S. Cl.
CPC .......... *F16K 5/0605* (2013.01); *F16K 5/0668* (2013.01); *F16K 5/0689* (2013.01); *F16K 27/067* (2013.01)

(58) Field of Classification Search
CPC ...... F16K 5/0605; F16K 5/068; F16K 5/0689; F16K 27/067; F16K 5/163; F16K 27/08; F16K 29/00; F16K 29/02; F16K 39/066; F16K 31/52425; F16K 31/52475; F16K 31/528; F16K 31/5284; F16K 31/5286;

(Continued)

(56) References Cited

U.S. PATENT DOCUMENTS 1,345,518 A * 7/1920 Van Brunt ............... F16K 3/262
                                                                251/229
2,541,715 A * 2/1951 Oestreicher ............. F16K 5/162
                                                                251/161

(Continued)

FOREIGN PATENT DOCUMENTS

EP           0207755 A2    1/1987
WO       2013116671 A1    8/2013

OTHER PUBLICATIONS

"Trunnion Mounted Ball Valve, Series: T60," <<http://www.kitz.com/trunnion_ball.html>>, Mar. 10, 2015, 3 pages, Kitz Corporation.

(Continued)

*Primary Examiner* — Michael R Reid
(74) *Attorney, Agent, or Firm* — Magleby, Cataxinos & Greenwood, P.C.

(57) ABSTRACT

An adjustable trunnion valve includes an obturator, a valve stem, at least one valve seal, and a trunnion. The trunnion and obturator are configured to translate the obturator along a longitudinal axis extending through the trunnion and the obturator upon rotation of the valve stem beyond one or both of its open position and its closed position. A method of operating an adjustable trunnion valve having an obturator coupled to a trunnion and a valve stem includes passing a fluid through the adjustable trunnion valve and rotating the valve stem to rotate the obturator about an axis of rotation and to simultaneously translate the obturator in a direction along the axis of rotation while the obturator is supported by the trunnion and while the fluid flows through the adjustable trunnion valve.

20 Claims, 11 Drawing Sheets

(58) Field of Classification Search
CPC .......... F16K 5/0647; F16K 5/08; F16K 5/162; F16K 5/204
USPC ................ 251/187–188, 192, 215–225, 251/315.08–315.09, 229, 180–185, 251/251–261
See application file for complete search history.

(56) References Cited

U.S. PATENT DOCUMENTS

| | | | |
|---|---|---|---|
| 2,705,609 A * | 4/1955 | Prescott | F16K 5/162 251/162 |
| 2,988,319 A * | 6/1961 | Erwin | F16K 5/162 251/163 |
| 3,058,484 A | 10/1962 | Feiring | |
| 3,132,836 A | 5/1964 | Dickerson | |
| 3,151,837 A | 10/1964 | Bentley-Leek | |
| 3,273,852 A | 9/1966 | Ripert | |
| 3,384,337 A | 5/1968 | Brown | |
| 4,020,864 A | 5/1977 | Church, Jr. | |
| 4,174,825 A * | 11/1979 | Nelimarkka | F16K 5/204 251/172 |
| 4,203,460 A | 5/1980 | Priese | |
| 4,262,691 A | 4/1981 | Kacal | |
| 4,286,614 A | 9/1981 | Kacal et al. | |
| 4,286,625 A * | 9/1981 | Tomlin | F16K 5/16 251/192 |
| 4,388,945 A | 6/1983 | Johnson et al. | |
| 4,390,039 A | 6/1983 | Johnson et al. | |
| 4,477,055 A | 10/1984 | Partridge | |
| 4,505,294 A | 3/1985 | Walter | |
| 4,562,860 A | 1/1986 | Walter et al. | |
| 4,566,482 A | 1/1986 | Stunkard | |
| 4,577,830 A | 3/1986 | Winegeart | |
| 4,579,316 A | 4/1986 | Velan | |
| 4,815,701 A | 3/1989 | Stone | |
| 5,004,005 A | 4/1991 | Graves | |
| 2012/0217425 A1 | 8/2012 | Beasley | |
| 2013/0200286 A1 | 8/2013 | Eagen | |

OTHER PUBLICATIONS

"McCannaseal® Top Entry Wedge-Seated Ball Valves: Regular and Full Port", Aug. 2013, RFP 100-2, Flowserve Corporation, Irving, Texas, USA, 24 pages.

"FCT Trunnion Mounted Split Body Ball Valves, Models HPA, HRA, DB," 2014, 16 pages, FCTMC-0220-US-1305, Pentair.

"TK Trunnion Mounted Ball Valves," Oct. 2013, 32 pages, SWP 1M 10/13 AD00856V, Cameron, Houston, Texas, USA.

"Product Guide," 24 pages, Truflo Marine Ltd, Birmingham, England.

"Truntech," <<http://www.valv.com/products/trunnion-ball-valves/truntech/>>, Nov. 19, 2014, 2 pages, ValvTechnologies.

International Search Report and Written Opinion for International application No. PCT/US2016/021407 dated May 30, 2016, 7 pages.

* cited by examiner

ADJUSTABLE TRUNNION VALVE AND RELATED METHODS

FIELD

Embodiments of the present disclosure relate to valves having rotatable obturators, such as ball valves or plug valves having a trunnion that is adjustable without disassembly of the valves.

BACKGROUND

Many valve types have been employed for stopping and controlling the flow of fluids in a pipe or other flow path. Each type of valve offers certain advantages and disadvantages. Some valve types include plug valves, ball valves, stop or globe valves, angle valves, butterfly valves, and gate valves.

Ball valves include a rotatable ball having a bore therethrough corresponding to the fluid flow path together with a seat for sealing with the ball surface. Typical ball valves have a valve body and a valve member operatively connected to the valve body by an upstream and a downstream seal. The valve body defines a flow passage having an upstream flow-through end, a downstream flow-through end, and a valve receiving chamber located between the upstream and downstream flow-through ends of the flow passage. The valve member (i.e., the rotatable ball) is located within the valve receiving chamber, and includes a throughbore that allows passage of fluid through the valve member. The seals and seats, in conjunction with the valve member and the valve receiving chamber, define a cavity around the valve member. To prevent leakage of the valve, the seals and seats are pressed against the valve member with a sealing pressure based, at least in part, on the maximum pressure environment in which the valve may be installed. The seals are typically oriented such that the valve member wedges between the seals in the valve receiving chamber: when the valve member is pressed farther into the valve receiving chamber, the pressure on the seals increases.

The valve member may be coupled to an actuator or a handle via a valve stem, which is selectively rotatable to rotate the valve member within the valve receiving chamber, between a fully open position and a fully closed position. Generally, in a two-way valve, the fully open position occurs when the throughbore is aligned with the flow passage at zero degrees of rotation from a centerline of the flow passage and the fully closed position occurs at ninety degrees of rotation of the valve member from the centerline.

It is generally known to adjust the seating of a ball valve without full disassembly of the valve. For example, U.S. Pat. No. 3,058,484 describes a ball valve with wedged seals. To adjust the seating, a packing nut is removed or backed off and the stem is moved upward to engage a splined portion of the stem 44 with an annular sealing member. The annular sealing member is then screwed downward to press the seals into the wedge and to tighten the seals against the ball. The stem is lowered back into engagement with the ball, and the packing nut is retightened for continued operation of the valve.

U.S. Pat. No. 3,132,836 describes a ball valve with converging valve seals that can be urged together and against a ball by tightening an adjusting nut.

Coil or other spring members may be used to automatically bias valve seals against valve balls, including after wear of the ball and/or valve seals, as shown, for example, in U.S. Pat. No. 3,384,337.

BRIEF SUMMARY

In some embodiments, an adjustable trunnion valve includes: an obturator within a valve body; a valve stem coupled to the obturator and configured to rotate the obturator relative to the valve body between an open position and a closed position; at least one valve seal abutting against a surface of the obturator and a surface of the valve body; and a trunnion coupled to the obturator. The trunnion and obturator can be configured to translate the obturator along a longitudinal axis extending through the trunnion and the obturator upon rotation of the valve stem beyond one or both of the open position and the closed position.

In certain embodiments, an adjustable trunnion valve includes: an obturator within a valve body; a valve stem coupled to the obturator and configured to rotate the obturator between an open position and a closed position; a first valve seal abutting against a first side of the obturator; a second valve seal abutting against a second side of the obturator opposite the first side of the obturator; and a trunnion assembly coupled to the obturator. The first valve seal and the second valve seal can be angled toward each other. The trunnion assembly may include a fixed base secured to the valve body and an adjustable extension. At least one of the fixed base, the adjustable extension, and the obturator defines a protrusion. At least one of the fixed base, the adjustable extension, and the obturator includes a member defining a recess. The protrusion is positioned at least partially within the recess and abutting against a first end of the recess when the obturator is in the open position, and against a second end of the recess when the obturator is in the closed position. Rotation of the valve stem beyond the open position and the closed position results in the protrusion rotating the member defining the recess, in changing a length of the trunnion assembly, and in vertically translating the obturator relative to the fixed base.

In some embodiments, a method of operating an adjustable trunnion valve having an obturator coupled to a trunnion and a valve stem includes passing a fluid through the adjustable trunnion valve and rotating the valve stem to rotate the obturator about an axis of rotation, and to simultaneously translate the obturator in a direction along the axis of rotation while the obturator is supported by the trunnion and while the fluid flows through the adjustable trunnion valve.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not actual views of any particular valve, but are merely idealized representations that are employed to describe example embodiments of the present disclosure. Additionally, elements common between figures may retain the same numerical designation.

As used herein, the term "valve" means and includes any device configured to regulate, direct, or control the flow of fluids (i.e., liquids and/or gases).

As used herein, the term "obturator" means and includes a valve closure member, such as disk, a gate, a plug, or a ball. For example, in a ball valve, the obturator is a rotating valve ball.

As used herein, the term "trunnion" means and includes a pin or pivot on which a member may rotate. In a ball valve having a rotating ball within a valve body, a trunnion may be a structural support oriented along an axis of rotation of the ball and providing vertical and radial support between the valve body and the ball.

As used herein, the term "adjustable trunnion" means and includes a trunnion over which the vertical position of a supported obturator may be varied. For example the vertical position of the obturator may be varied by varying the length of the adjustable trunnion or by threading the obturator farther onto or off a part of the adjustable trunnion. Thus, adjustable trunnions include trunnions that have variable lengths and trunnions having a variable engagement length with an obturator.

Figure 1:
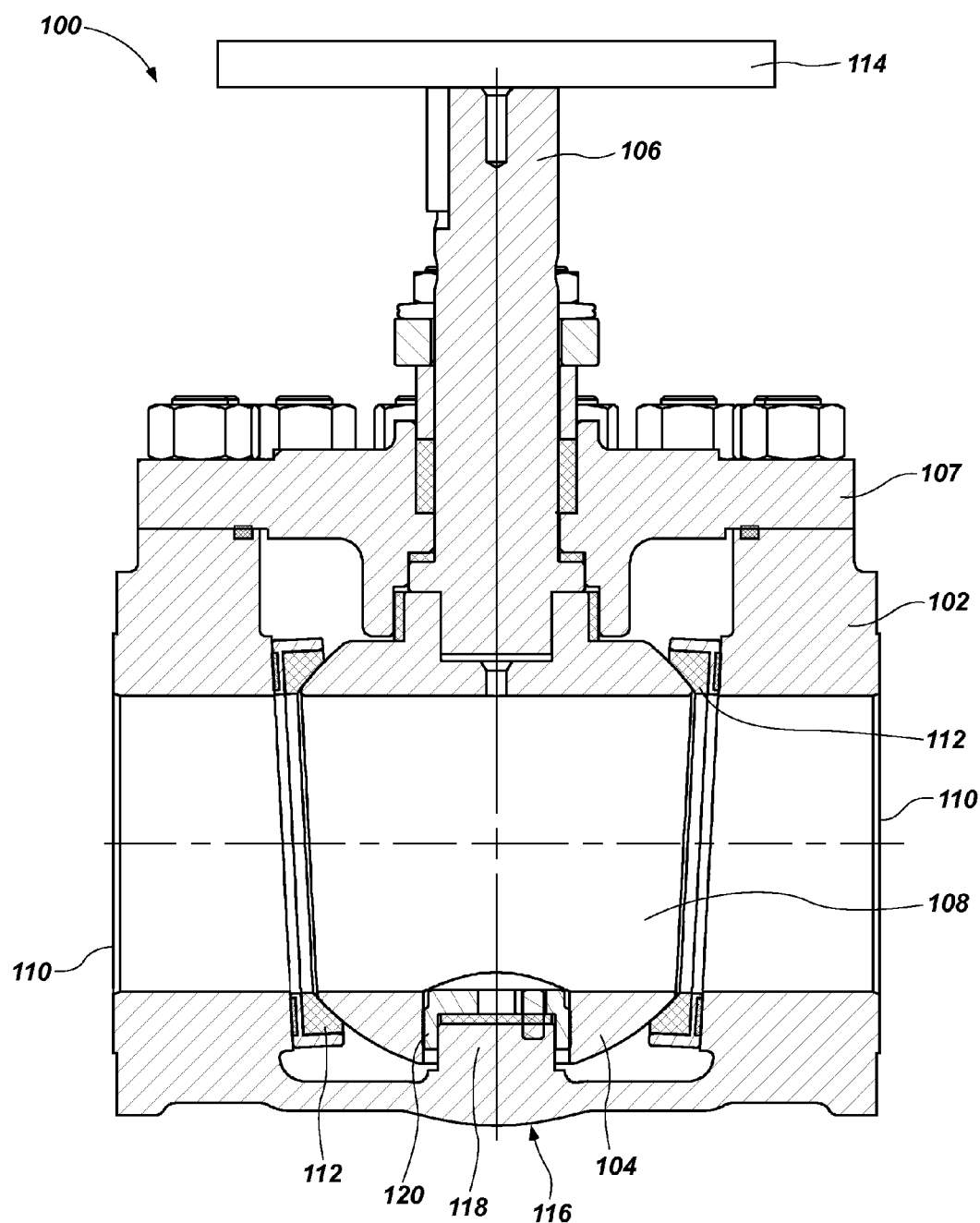
FIG. 1 is a simplified cross-sectional side view illustrating an embodiment of an adjustable trunnion valve according to the present disclosure.

FIG. 1 is a simplified cross-section illustrating a valve 100 having an adjustable trunnion 116. The valve 100 shown in FIG. 1 includes a valve body 102, an obturator 104, and a valve stem 106. A bonnet 107 may be secured to the valve body to keep the obturator 104 in place and seal the moving parts of the valve 100 from outside elements. The obturator 104 may be a valve ball, a plug, or any other closure member. The obturator 104 is depicted in FIG. 1 as a ball, but the obturator 104 need not have any spherical surfaces. The obturator 104 may have any combination of flat surfaces (e.g., as shown at the top of the obturator 104 in FIG. 1) and rounded surfaces that allow the obturator 104 to rotate within the valve body 102 and direct the flow of fluid. For example, the obturator 104 may include cylindrical, parabolic, and/or frustoconical surfaces. In some embodiments, the obturator 104 may be a tapered plug. The obturator 104 defines a through hole (or orifice) 108 therethrough.

The valve stem 106 shown in FIG. 1 is coupled to the obturator 104 and configured to rotate the obturator 104 relative the valve body 102 between an open position and a closed position. For example, in the open position (i.e., when the obturator 104 is in the orientation shown in FIG. 1), the through hole 108 may be oriented in line with ports 110 to provide a continuous fluid flow path between the ports 110. In the closed position, the through hole 108 may be oriented perpendicular to a line connecting the ports 110, blocking the fluid flow path between the ports 110. The through hole 108 may be approximately cylindrical, but may have other shapes in some embodiments. For example, the through hole 108 may have an L-shape or a T-shape to direct flow to additional ports or ports in other configurations. The through hole 108 may have a circular or non-circular cross section. A valve 100 in which the through hole 108 has a non-circular cross section may be better able than a valve 100 with an entirely circular through hole 108 to precisely control flow rates when the obturator 104 is oriented between the open position and the closed position. For example, the through hole 108 may have a V-shaped or triangular cross section.

One or more valve seals 112 may be configured to abut against a surface of the obturator 104 to form a fluid-tight seal between the obturator 104 and the valve body 102. The valve seals 112 may be adjacent angled surfaces of the valve body 102. For example, surfaces of the valve body 102 may be angled inward toward the bottom of the obturator 104, such that as the obturator 104 and the valve seals 112 are urged lower into the valve body 102, the spacing between the valve body 102 and the obturator 104 decreases. Thus, when the obturator 104 is relatively lower in the valve body 102, the fit between the obturator 104, the valve seals 112, and the valve body 102 is relatively tighter. The valve seals 112 may be configured such that the obturator 104 may rotate freely (i.e., without mechanical interference) between the open position and the closed position adjacent the valve seals 112.

The valve seals 112 may be formed of a single material or of multiple materials. For example, the valve seals 112 may include plastic materials (e.g., polyether ether ketone (PEEK), polychlorotrifluoroethene (KEL-F), polyimide-based plastics (e.g., VESPEL®, available from E. I. du Pont de Nemours and Company, of Wilmington, Del.), elastomeric materials, hard materials (e.g., carbon graphite), metals or alloys (e.g., titanium or stainless steel, such as NITRONIC 60®, an alloy of Cr, Mn, Ni, Si, N, C, and Fe, available from High Performance Alloys, of Windfall, Ind.), etc. In some embodiments, the valve seals 112 may include a metal or alloy ring configured to provide structural support to a resilient material. In other embodiments, the valve seals 112 may be made entirely of a metal, entirely of a hard material, entirely of a resilient material, etc.

A rotation device 114 may be used to rotate the valve stem 106 between the open position and the closed position. For example, the rotation device 114 may include a handle or an actuator, and may be configured to be operated by a human operator, by an electrical current, compressed air, etc. If the rotation device 114 includes a handle, the handle may include a wheel, a tee, a lever, or any other means to apply a torque to the valve stem 106. In some embodiments, the rotation device 114 may be controlled by a computer.

The valve 100 may further comprise a trunnion 116, which may be configured to keep the obturator 104 in position within the valve body 102. The obturator 104 may rest mainly on the trunnion 116, and the trunnion 116 may facilitate rotation of the obturator 104 by vertically and radially supporting the obturator 104. Therefore, the valve seals 112 may experience reduced forces from the obturator 104 as compared to an obturator of a valve without a trunnion.

The trunnion 116 may be configured such that the vertical position of the obturator 104 is adjustable. To account for differences in manufacturing (e.g., within acceptable tolerance limits) and to balance forces acting on the valve seals 112 and the trunnion 116, the position of the obturator 104 may be adjusted during assembly of the valve 100, such as by lengthening or shortening the trunnion 116. Furthermore, the position of the obturator 104 may be adjusted during use of the valve 100, such as to account for wear on the valve seals 112. For example, rotational motion of the obturator 104 to open and close the valve 100 may cause material of the valve seals 112 to gradually wear away, which may eventually breach the seal between the obturator 104 and the valve seals 112. By shortening the trunnion 116 or by engaging more threads of the obturator 104 with the trunnion 116, the obturator 104 and valve seals 112 may slide down further into the valve body 102, forcing the valve seals 112 inward toward the obturator 104. This may tighten the seal between the obturator 104, the valve seals 112, and the valve body 102. Lengthening the trunnion 116 or engaging fewer threads of the obturator 104 may loosen the seal between the obturator 104, the valve seals 112, and the valve body 102, and may make rotating the obturator 104 relatively easier. Thus, the obturator 104 may be translated along a longitudinal axis extending through the trunnion 116 and the obturator 104, such as by lengthening or shortening the trunnion 116.

Figure 2A:
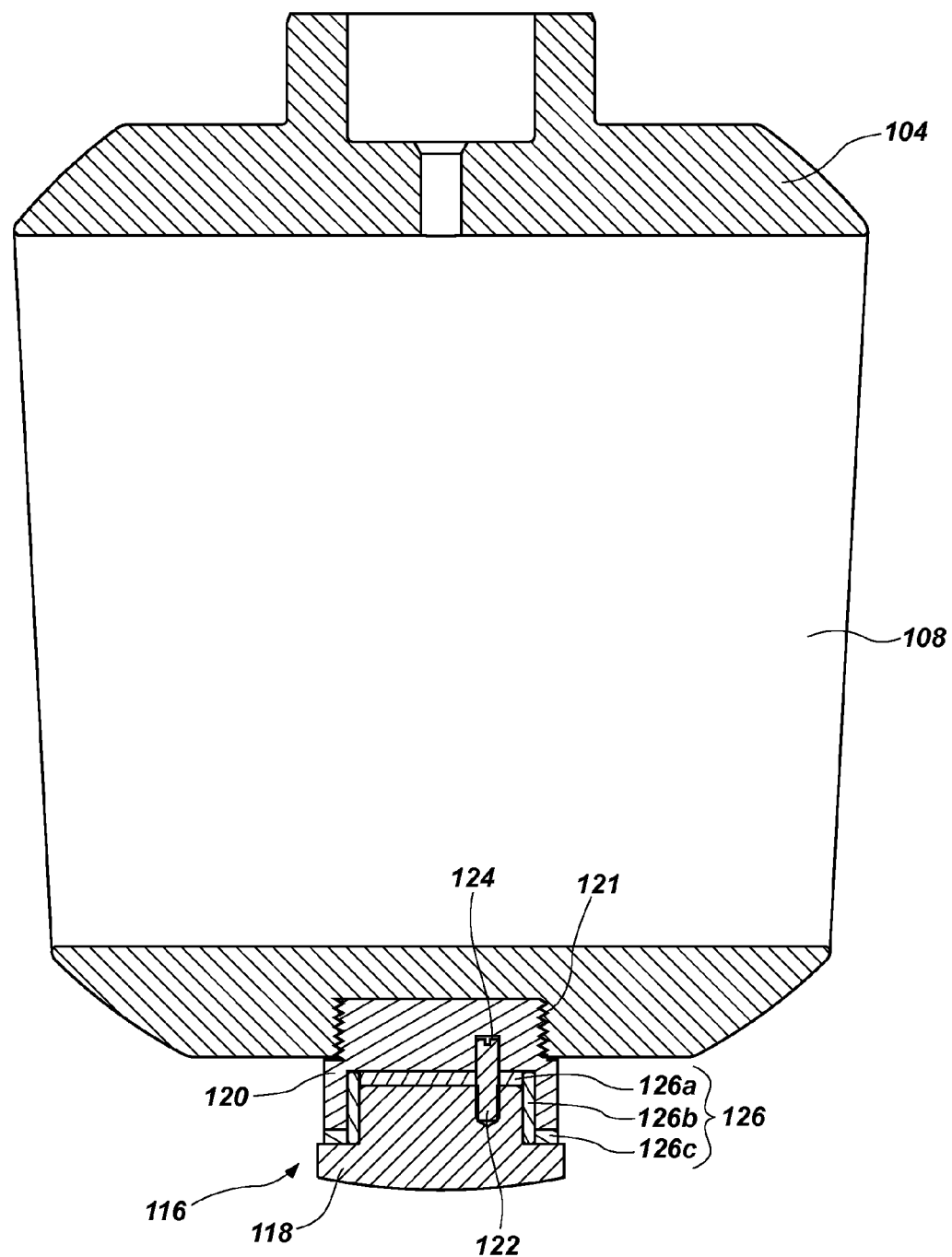
FIG. 2A is a simplified cross-section side view of an obturator and a trunnion, as may be used in the valve shown in FIG. 1.
Figure 2B:
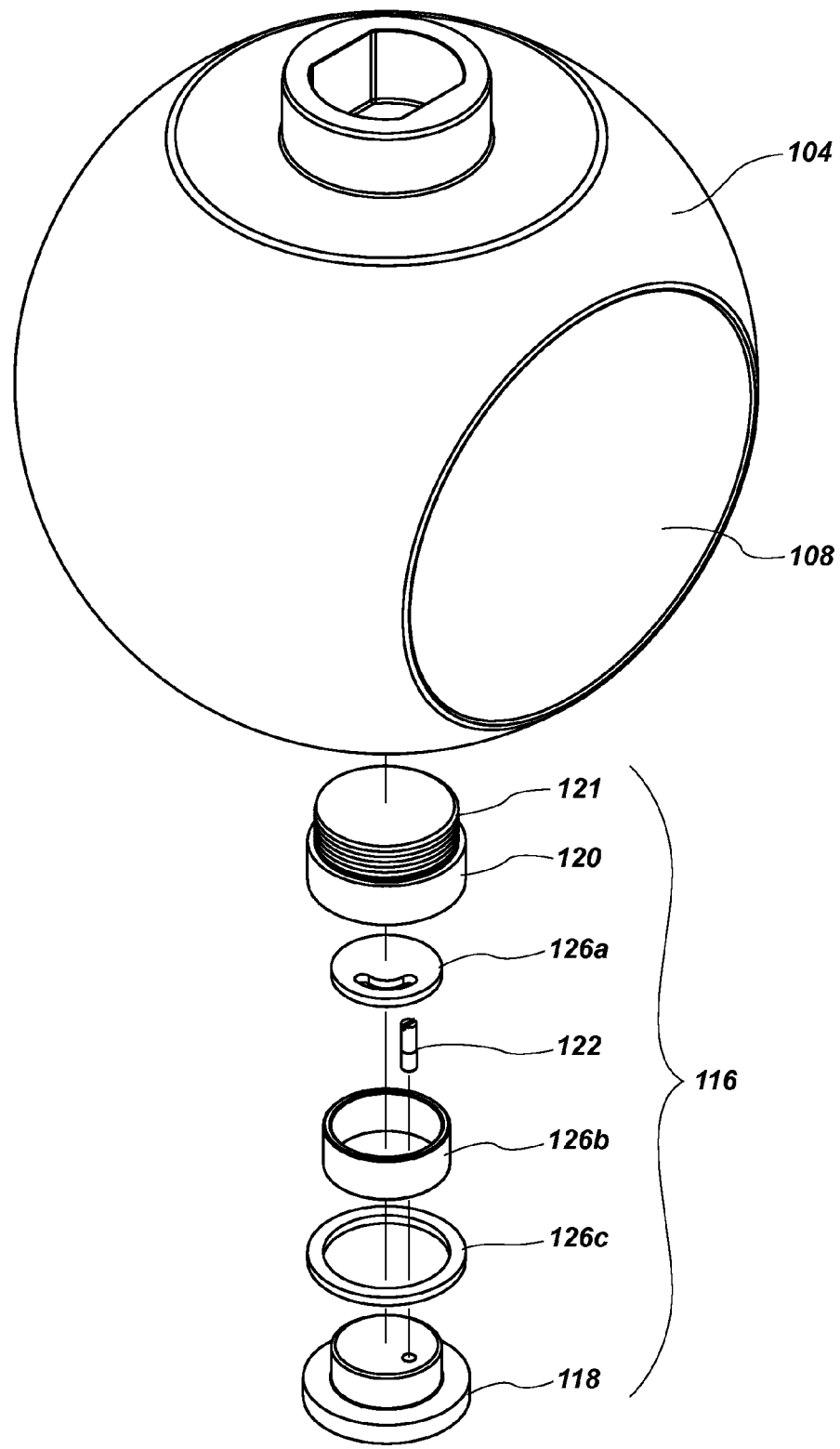
FIG. 2B is an exploded perspective view of parts of the obturator and trunnion shown in FIG. 2A.
Figure 2C:
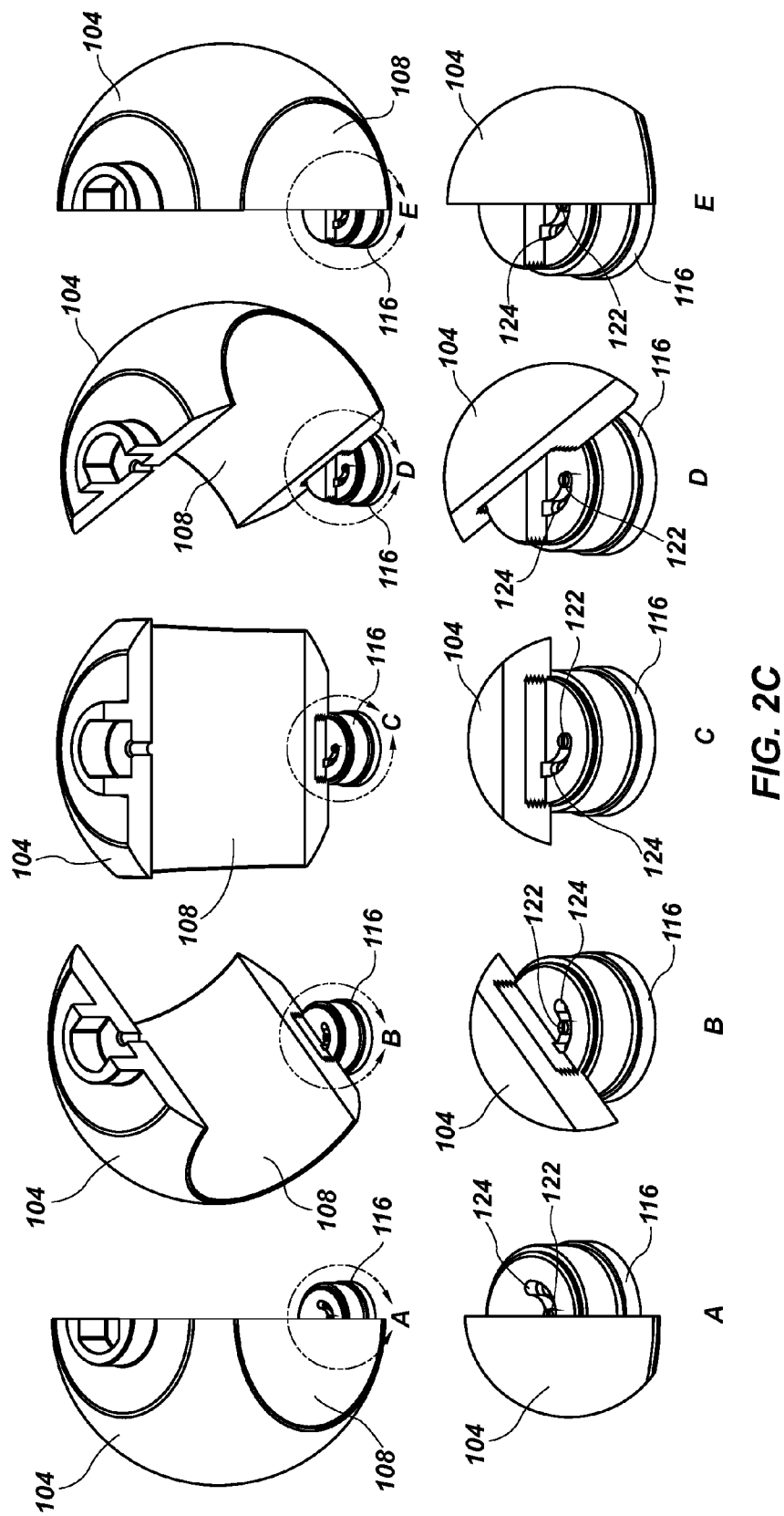
FIG. 2C is a partially cutaway perspective view of the obturator and trunnion shown in FIG. 2A at various rotational positions.

The trunnion 116 may include a fixed base 118, secured to the valve body 102, and an extension 120 coupled with the base 118. The base 118 may be stationary with respect to the valve body 102. The extension 120 may be threaded such that the position of the obturator 104 with respect to the trunnion 116 may be adjusted. For example, FIGS. 2A through 2C show an embodiment of a obturator 104 and a trunnion 116 in which the extension 120 includes a sleeve and threads 121 configured to engage with threads secured to (e.g., integral with) the obturator 104. FIG. 2A is a simplified cross-sectional view of the obturator 104 and trunnion 116, and an exploded view thereof is shown in FIG. 2B. FIG. 2C shows perspective views of the obturator 104 and trunnion 116, with a portion of each cut away, in each of several positions A through E as the obturator 104 is turned. In position A, if the ports 110 (see FIG. 1) are located at the left and right of the obturator 104, the valve 100 is closed. In position B, the valve 100 is partially open. In position C, the valve 100 is fully open. In position D, the valve 100 is partially open, and the obturator 104 has translated vertically, up or down from its location in positions A through C. In position E, the valve 100 is again closed, and the obturator 104 has translated further. Thus, between positions A through C, the obturator 104 may have a constant vertical position with respect to the valve body 102 while the obturator 104 and extension 120 rotate; between positions C and E, the extension 120 may remain stationary while the obturator 104 both rotates and translates.

When the obturator 104 rotates independently of the extension 120 (e.g., between positions C and E of FIG. 2C), the obturator 104 may translate vertically up or down, depending on the direction of rotation, and engage more or fewer threads of the extension 120. When the obturator 104 and the extension 120 rotate together (e.g., between positions A and C of FIG. 2C), the obturator 104 may maintain its vertical position. The trunnion 116 may vertically and radially support the obturator 104, both when the obturator 104 is vertically translating and when the obturator 104 is vertically stationary.

In operation of the valve 100 to control flow of material therethrough, the obturator 104 may typically be rotated 90° between the open and closed positions (e.g., A and C), and the extension 120 may typically rotate in concert with the obturator 104, such that there is no vertical translation of the obturator 104. A protrusion 122 (e.g., a pin) secured to the base 118 or the extension 120 may be disposed within a slot or recess 124 in a corresponding part (e.g., the extension 120 or the base 118) to prevent the extension 120 from rotating more than 90°. Thus, if the obturator 104 is rotated more than 90° (e.g., as in positions D and E), the extension 120 may stop rotating, and the obturator 104 may be threaded lower or higher on the extension 120. Thus, the obturator 104 may rotate independently of the extension 120 after the pin 122 contacts an end of the recess 124. As is evident from FIG. 2C, adjustment of the vertical position of the obturator 104 may involve temporarily opening or closing the valve 100.

If the valve 100 is to be adjusted while in service, the obturator 104 may be rotated 180° from an open position (A) to another open position (E) or from a closed position to another closed position. Depending on the starting position of the extension 120 and the pin 122, the extension 120 may rotate either 0° or 90° when the obturator 104 is rotated 180°. Thus, the obturator 104 may rise or fall a distance one quarter to one half of a thread pitch of the threads 121. In subsequent 180° rotations of the obturator 104 in the same direction, the obturator 104 may rise or fall one half of the thread pitch. The obturator 104 may be adjusted as necessary without removing the valve 100 from service or disconnecting flow lines. The obturator 104 may be configured to translate vertically whenever the obturator 104 rotates independently of the extension 120.

One or more bearings 126 may be disposed between the extension 120 and the base 118 to promote the rotation of the extension 120 when the obturator 104 rotates between the open and closed positions. For example, FIGS. 2A and 2B show a trunnion 116 having a three-piece bearing 126 with a disc-shaped portion 126a, an elongate ring 126b, and a flat ring or washer 126c. The disc-shaped portion 126a of the bearing 126 may define an orifice therethrough to allow free rotation of the bearing 126 with the extension 120. The parts of the bearing 126 shown may be connected to one another or separate, and one or more may be omitted entirely. In some embodiments, the bearing 126 may be integral with the base 118 or the extension 120 (e.g., as surface coatings, etc.). The bearing 126 may include any suitable material to allow rotation of the extension 120, such as metal, plastic, graphite (e.g. GRAFOIL®, a flexible seal made from graphite, available from GrafTech Int'l, of Lakewood, Ohio), etc. One or more lubricating materials may also be disposed between the base 118 and the extension 120.

In some embodiments, and as shown in FIG. 1, the trunnion 116 may be integral with the valve body 102. In other embodiments, the trunnion 116 may be a separate body secured to the valve body 102 (e.g., by a press fit, threads, a weld, etc.).

Figure 3A:
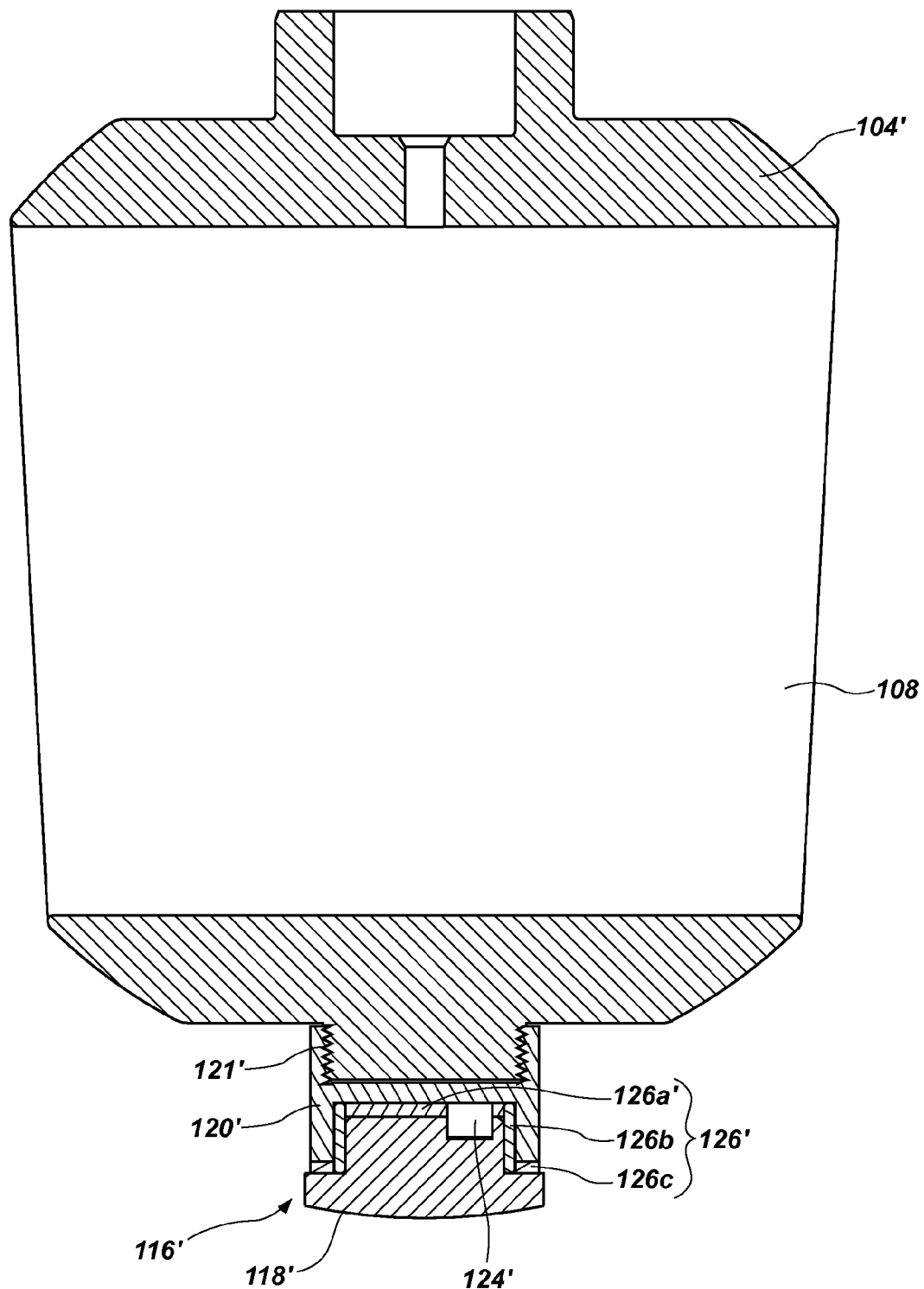
FIG. 3A is a simplified cross-section side view of another embodiment of an obturator and a trunnion, as may be used in the valve shown in FIG. 1.
Figure 3B:
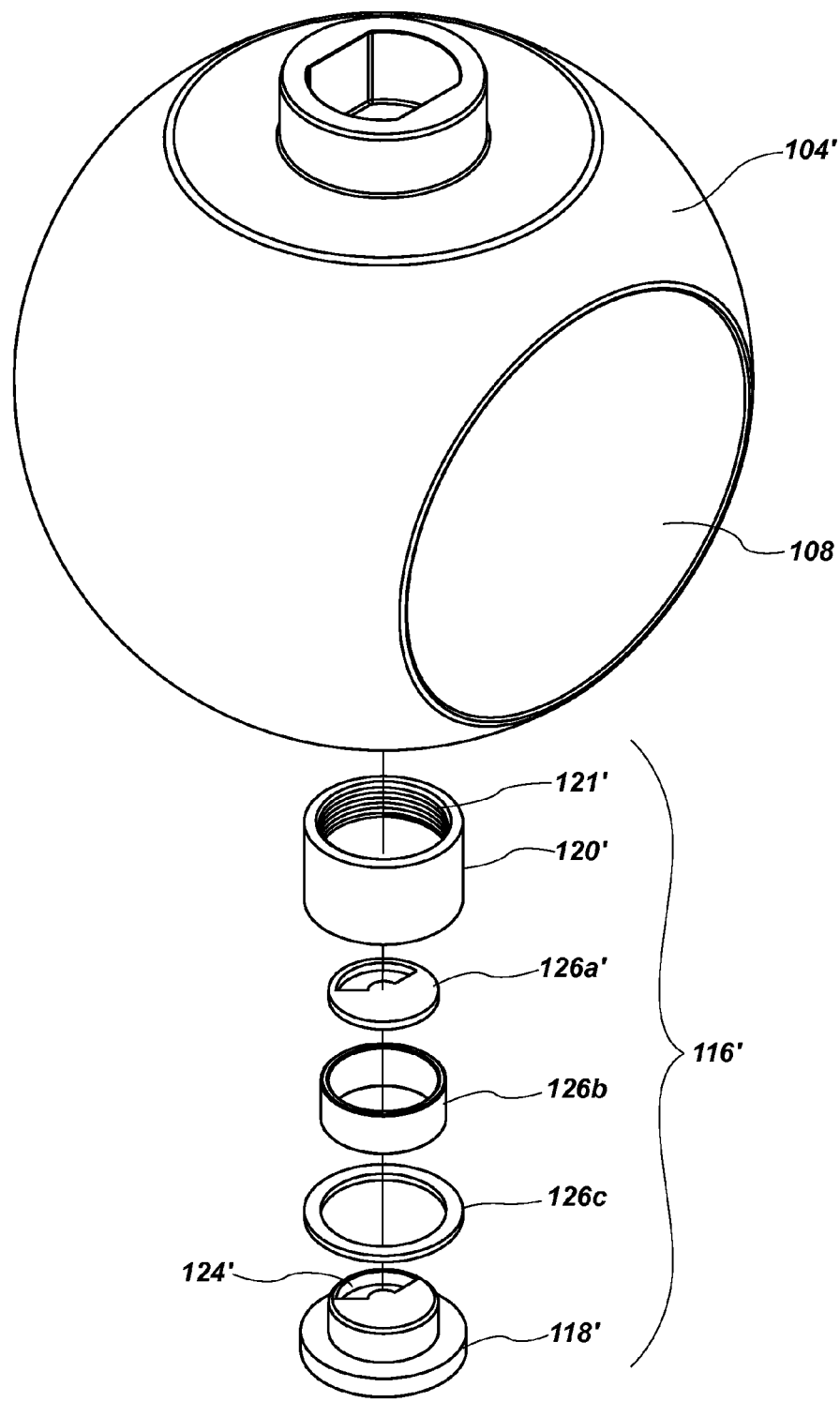
FIG. 3B is an exploded perspective view of parts of the obturator and trunnion shown in FIG. 3A.
Figure 3C:
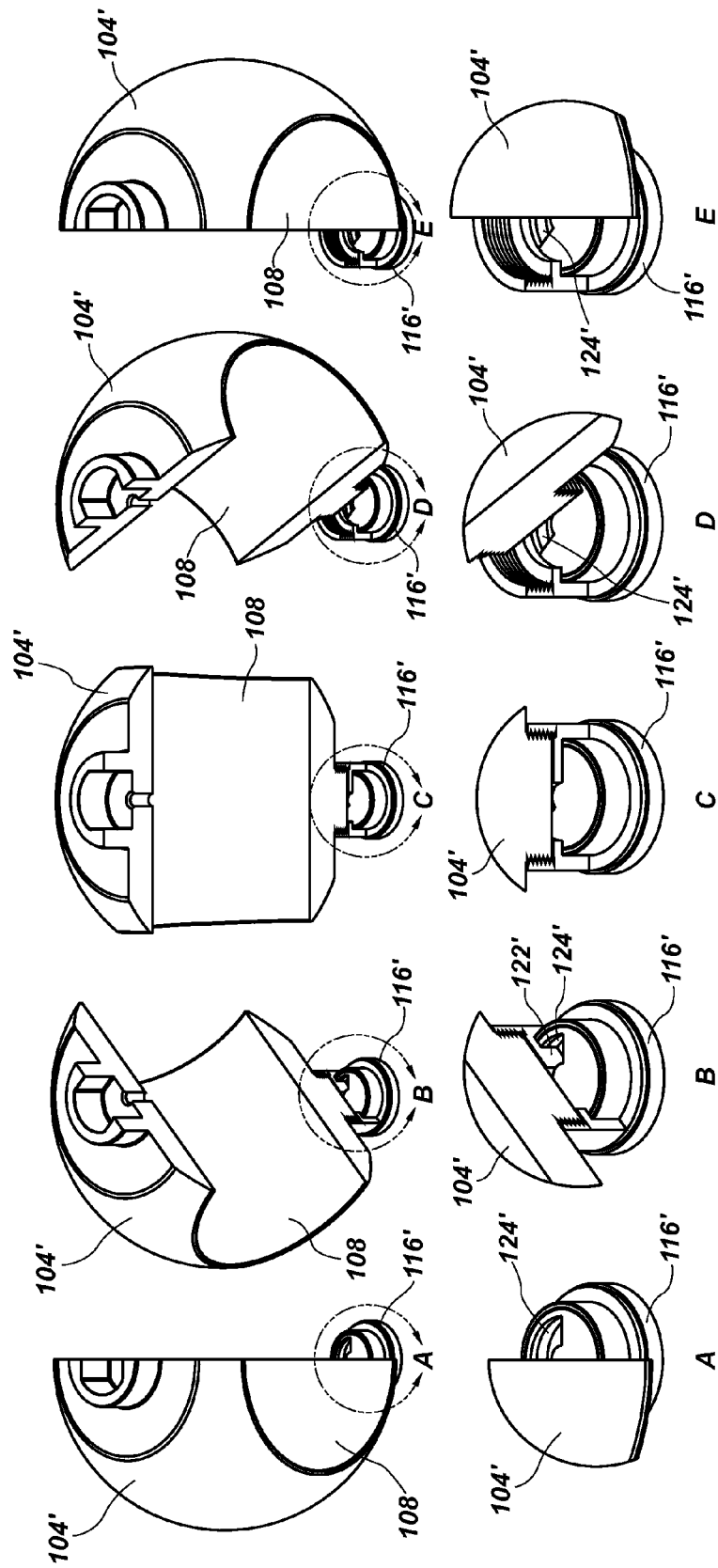
FIG. 3C is a partially cutaway perspective view of the obturator and trunnion shown in FIG. 3A at various rotational positions.

FIGS. 3A through 3C show another embodiment of a obturator 104' and a trunnion 116' in which an extension 120' includes a sleeve and threads 121' configured to engage with threads secured to (e.g., integral with) the obturator 104'. The trunnion 116' has female threads 121', in contrast to the male threads 121 of the trunnion 116 shown in FIGS. 2A through 2C. Furthermore, the trunnion 116' shown in FIGS.

3A through 3C has a protrusion 122' from the extension 120' configured to rotate within a recess 124' in the base 118'. The principle of operation of the trunnion 116 of FIGS. 2A through 2C and the trunnion 116' of FIGS. 3A through 3C is the same. The views shown in FIG. 3C correspond to approximately the same positions shown in FIG. 2C, and the discussion of those positions is not repeated here.

Figure 4A:
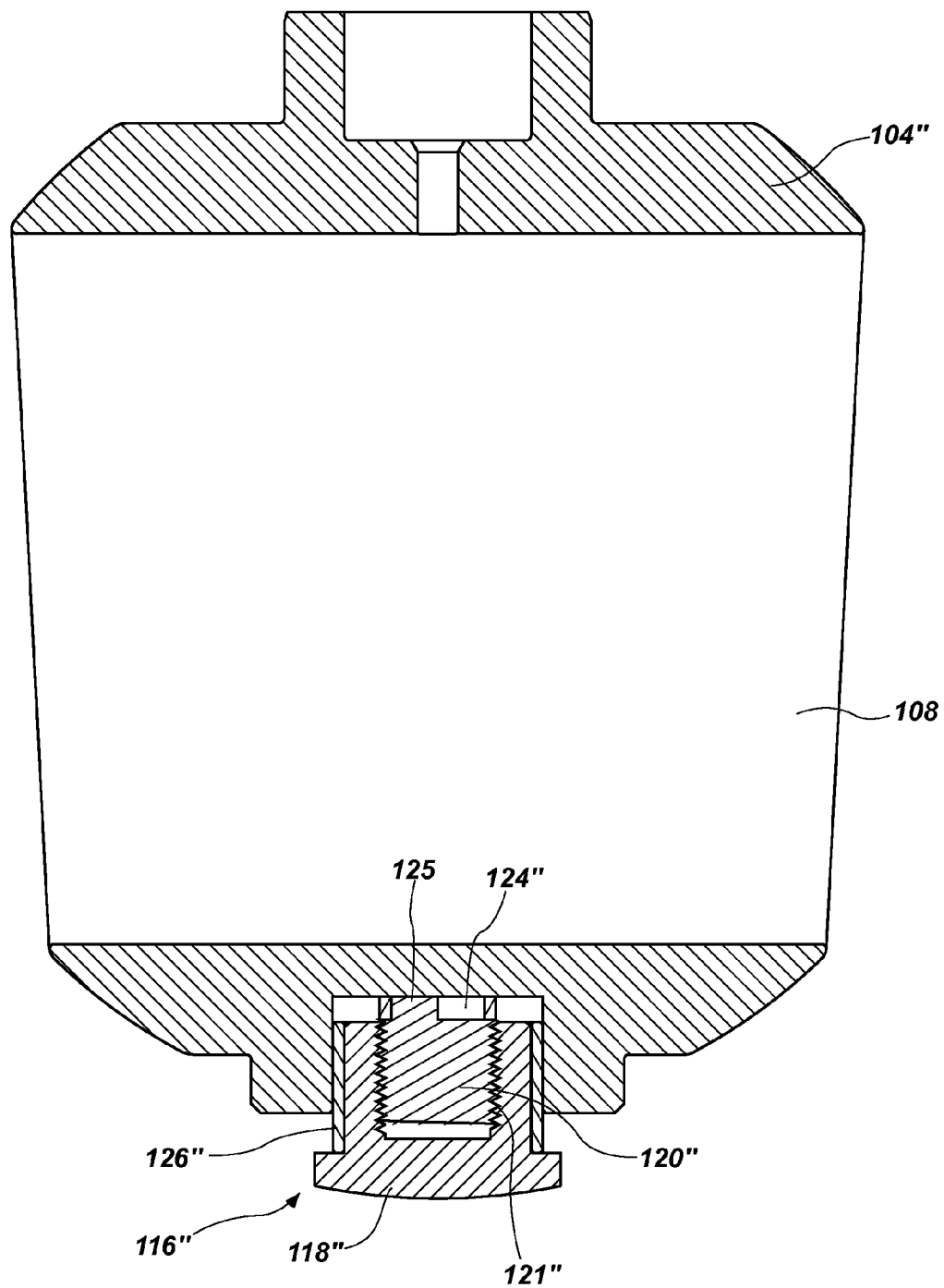
FIG. 4A is a simplified cross-section side view of another embodiment of an obturator and a trunnion, as may be used in the valve shown in FIG. 1.
Figure 4B:
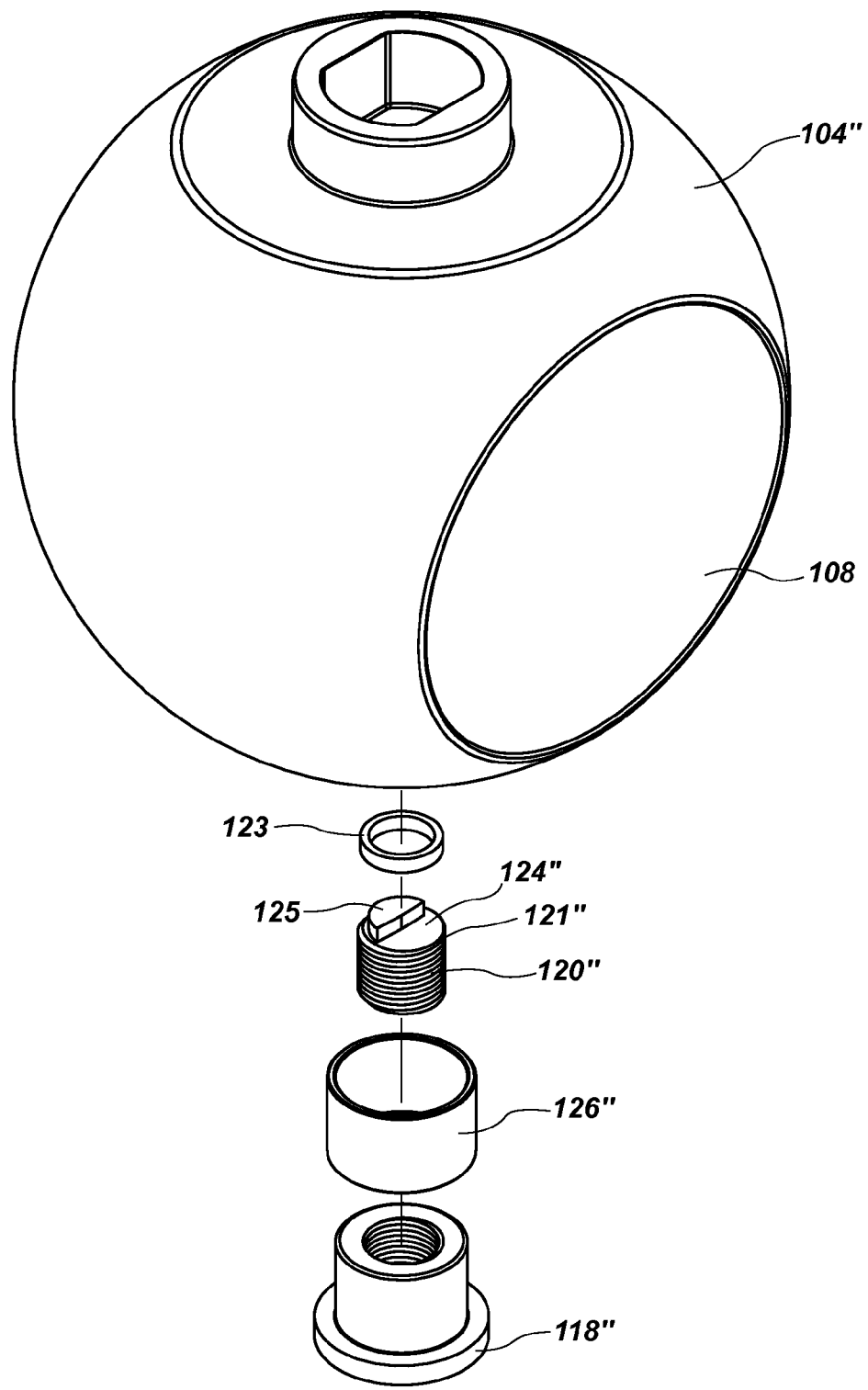
FIG. 4B is an exploded perspective view of parts of the obturator and trunnion shown in FIG. 4A.
Figure 4C:
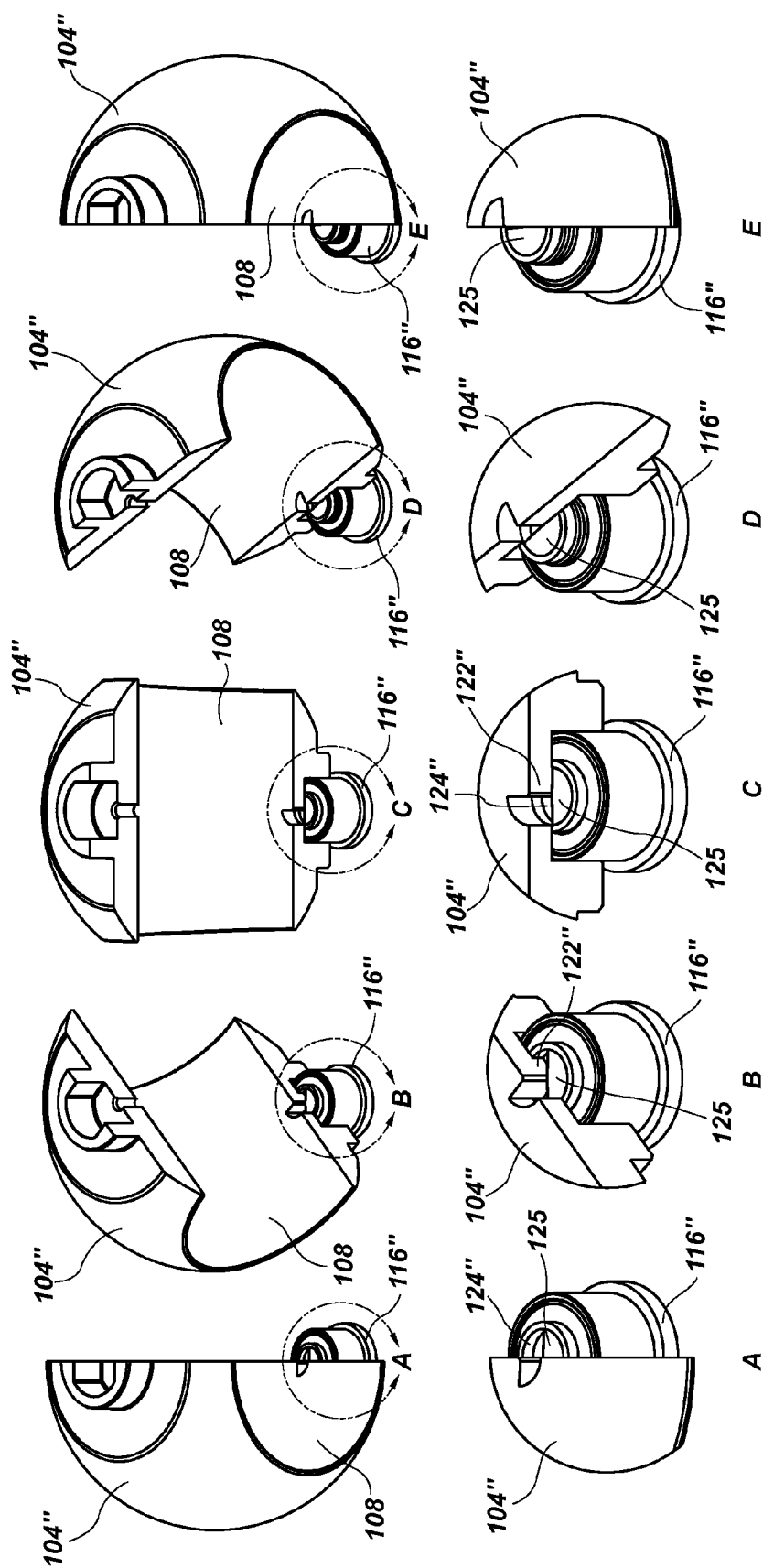
FIG. 4C is a partially cutaway perspective view of the obturator and trunnion shown in FIG. 4A at various rotational positions.

FIGS. 4A through 4C show another embodiment of a obturator 104" and a trunnion 116" in which an extension 120" includes a riser and threads 121" configured to engage with threads within the base 118". The extension 120" may have a half-cylinder protrusion 125, which together with a bearing 123 over the top of the extension 120", defines a recess 124". The obturator 104" may have a quarter-cylinder protrusion 122" disposed within the recess 124", such that the obturator 104" can rotate 90° (one-quarter turn) before engaging the extension 120". The bearing 123 may be disposed between the extension 120" and the obturator 104", and may operate as a retaining ring to keep the protrusion 122" and the protrusion 125 aligned within the same cylindrical volume. A bearing 126" may be disposed between the base 118" of the trunnion 116" and the obturator 104". A portion of the obturator 104" may surround the trunnion 116". In operation, when the obturator 104" rotates more than 90°, the trunnion 116" changes length (i.e., because the extension 120" screws into or out of the base 118"), causing the obturator 104" resting on the extension 120" of the trunnion 116" to translate vertically.

Figure 5:
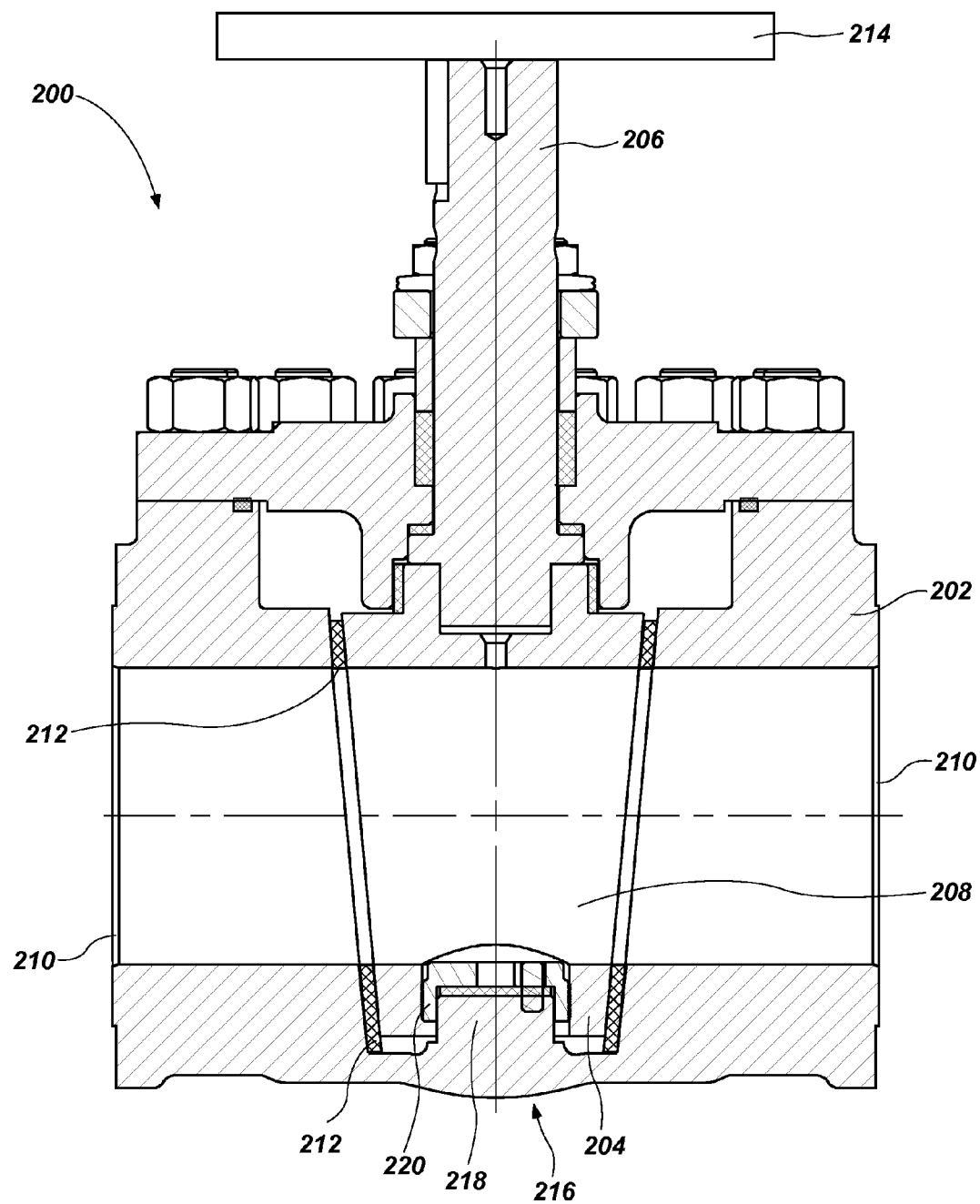
FIG. 5 is a simplified cross-sectional side view illustrating another embodiment of an adjustable trunnion valve.

FIG. 5 shows a simplified cross-section illustrating a plug valve 200 having an adjustable trunnion 216. The valve 200 includes a valve body 202, a rotatable plug 204 (i.e., an obturator), and a valve stem 206. The rotatable plug 204 defines a through hole 208 or orifice therethrough configured to allow fluid to flow between ports 210 when the rotatable plug 204 is in an open position. In some embodiments, the rotatable plug 204 may be tapered.

A valve seal 212 may be configured to abut against a surface of the rotatable plug 204 to form a seal between the rotatable plug 204 and the valve body 202. The valve seal 212 may be adjacent a surface of the valve body 202 having approximately the same shape as an outer surface of the rotatable plug 204. For example, the surface of the valve body 202 adjacent the valve seal 212 may be a frustoconical shape, angled inward toward the bottom of the valve body 202. The valve seal 212 may be stationary with respect to the valve body 202, such that as the rotatable plug 204 is urged lower into the valve body 202, the rotatable plug 204 presses against the valve seal 212 to for a fluid-tight seal. When the rotatable plug 204 is relatively lower in the valve body 202, the fit between the rotatable plug 204 and the valve body 202 and/or the valve seal 212 is relatively tighter. The valve seal 212 may be a single unitary body, such a frustoconical sleeve having holes matching the through hole 208 or the ports 210. In some embodiments, the valve seal 212 may include two or more parts. The valve seal 212 may be configured such that the rotatable plug 204 may rotate freely (i.e., without mechanical interference) between the open position and the closed position adjacent the valve seal 212. In some embodiments, the valve seal 212 may be omitted altogether, and the rotatable plug 204 may form a seal directly against the valve body 202. The valve seal 212, if present, may be formed of any selected material, such as those described above with respect to the valve seals 112 shown in FIG. 1.

In some embodiments, the valve body 202 and/or rotatable plug 204 may have a coating, such as a coating of a material having a relatively lower coefficient of friction than the material of the valve body 202 and/or the rotatable plug 204. The coating may be a resilient material to promote the formation of a fluid-tight seal between the valve body 202 and the rotatable plug 204 when the valve 200 is closed. For example, a coating on the rotatable plug 204 may include an elastomeric material.

A rotation device 214 may be used to rotate the valve stem 206 between the open position and the closed position, such as described above with respect to FIG. 1.

The valve 200 may further comprise a trunnion 216, which may be configured to keep the rotatable plug 204 in position within the valve body 202. The rotatable plug 204 may rest mainly on the trunnion 216, and the trunnion 216 may facilitate rotation of the rotatable plug 204 by vertically and radially supporting the rotatable plug 204. Therefore, the valve seal 212 (if present) and/or the valve body 202 may experience reduced forces from the rotatable plug 204 as compared to a plug of a valve without a trunnion.

The trunnion 216 may be configured such that the vertical position of the rotatable plug 204 is adjustable. That is, the trunnion 216 may be an adjustable trunnion. For example, the trunnion 216 may include a fixed base 218, secured to the valve body 202, and an extension 220 coupled with the base 218. The fixed base 218 and extension 220 may be configured similar to the fixed bases 118, 118', and 118" and extensions 120, 120', and 120" shown and described in FIGS. 1 through 4C. The valve 200 may be operated in a similar manner as the valve 100 shown in FIG. 1.

Compared to prior art designs of adjustable non-trunnion and trunnion valves, the trunnion of the proposed designs may provide vertical support for the obturator both before and after the adjustment, without the use of springs that complicate the assembly and provide more moving parts that may fail. In addition, the adjustment of the proposed designs could, in some implementations, be accomplished simply by over-rotation of the valve stem without a tool, such as without a wrench that would be required to turn adjustment nuts of conventional trunnion valves. Adjustments may be performed without removing the valves from service or diverting fluid flow, saving costs and time in maintenance.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various valve types and configurations.

What is claimed is:

1. An adjustable trunnion valve, comprising:
   an obturator within a valve body;
   a valve stem coupled to the obturator and configured to rotate the obturator relative to the valve body between an open position and a closed position;
   at least one valve seal abutting against a surface of the obturator and a surface of the valve body; and
   a trunnion coupled to the obturator, wherein the trunnion comprises a threaded sleeve configured to rotate 90° over a stationary support, wherein the trunnion further comprises a bearing between the threaded sleeve and the stationary support, wherein the trunnion and obturator are configured to translate the obturator along a longitudinal axis extending through the trunnion and the obturator upon rotation of the valve stem beyond one or both of the open position and the closed position, wherein the threaded sleeve is configured to rotate without vertically translating the obturator when the obturator is rotated between the open position and the closed position.

2. The adjustable trunnion valve of claim 1, wherein the obturator is configured to rotate independently of the threaded sleeve when the obturator is rotated more than 90°.

3. The adjustable trunnion valve of claim 1, wherein the obturator is configured to translate along the longitudinal axis when the obturator rotates independently of the threaded sleeve.

4. The adjustable trunnion valve of claim 1, wherein the stationary support is integral with the valve body.

5. The adjustable trunnion valve of claim 1, wherein the at least one valve seal comprises a sealing surface configured to abut the obturator.

6. An adjustable trunnion valve, comprising:
an obturator within a valve body;
a valve stem coupled to the obturator and configured to rotate the obturator relative to the valve body between an open position and a closed position;
at least one valve seal abutting against a surface of the obturator and a surface of the valve body; and
a trunnion coupled to the obturator, wherein the trunnion and obturator are configured to translate the obturator along a longitudinal axis extending through the trunnion and the obturator upon rotation of the valve stem beyond one or both of the open position and the closed position, wherein the trunnion comprises a riser threadably engaged with a stationary support comprising a sleeve, and wherein the riser comprises a post within the sleeve, wherein the obturator is configured to rotate the riser when the obturator rotates more than 90°.

7. The adjustable trunnion valve of claim 6, wherein the obturator is configured to rotate between the open position and the closed position without vertical translation.

8. An adjustable trunnion valve, comprising:
an obturator within a valve body;
a valve stem coupled to the obturator and configured to rotate the obturator between an open position and a closed position;
a first valve seal abutting against a first side of the obturator;
a second valve seal abutting against a second side of the obturator opposite the first side of the obturator, wherein the first valve seal and the second valve seal are angled toward each other; and
a trunnion assembly coupled to the obturator, the trunnion assembly comprising:
a fixed base secured to the valve body; and
an adjustable extension;
wherein at least one of the fixed base, the adjustable extension, and the obturator defines a protrusion, and wherein at least one of the fixed base, the adjustable extension, and the obturator includes a member defining a recess, the protrusion positioned at least partially within the recess and abutting against a first end of the recess when the obturator is in the open position and against a second end of the recess when the obturator is in the closed position, wherein rotation of the valve stem beyond the open position and the closed position results in the protrusion rotating the member defining the recess, changing a length of the trunnion assembly, and vertically translating the obturator relative to the fixed base.

9. The adjustable trunnion valve of claim 8, wherein the adjustable extension comprises a set of threads.

10. The adjustable trunnion valve of claim 9, wherein the obturator comprises a set of threads configured to mate with the threads of the adjustable extension.

11. The adjustable trunnion valve of claim 9, wherein the fixed base comprises a set of threads configured to mate with the threads of the adjustable extension.

12. The adjustable trunnion valve of claim 8, wherein the trunnion assembly further comprises at least one bearing.

13. The adjustable trunnion valve of claim 12, wherein the at least one bearing is disposed between the fixed base and the adjustable extension.

14. The adjustable trunnion valve of claim 12, wherein the at least one bearing is disposed between the fixed base and the obturator.

15. A method of operating an adjustable trunnion valve comprising an obturator coupled to a trunnion and a valve stem, the method comprising:
passing a fluid through the adjustable trunnion valve, wherein the trunnion comprises a threaded sleeve configured to rotate 90° over a stationary support, wherein the trunnion further comprises a bearing between the threaded sleeve and the stationary support, wherein the trunnion and obturator are configured to translate the obturator along a longitudinal axis extending through the trunnion and the obturator upon rotation of the valve stem beyond one or both of the open position and the closed position, wherein the threaded sleeve is configured to rotate without vertically translating the obturator when the obturator is rotated between the open position and the closed position; and
rotating the valve stem to rotate the obturator about an axis of rotation, wherein rotating the valve stem may simultaneously translate the obturator in a direction along the axis of rotation while the obturator is supported by the trunnion and while the fluid flows through the adjustable trunnion valve.

16. The method of claim 15, further comprising rotating the valve stem to rotate the obturator about the axis of rotation without translating the obturator vertically in a direction along the axis of rotation.

17. The method of claim 16, wherein rotating the valve stem to rotate the obturator about the axis of rotation without translating the obturator vertically in a direction along the axis of rotation comprises opening or closing the adjustable trunnion valve.

18. The method of claim 15, wherein rotating the valve stem to rotate the obturator about an axis of rotation and to simultaneously translate the obturator vertically in a direction along the axis of rotation while the obturator is supported by the trunnion comprises translating the obturator without disassembling the valve.

19. The method of claim 15, wherein rotating the valve stem to rotate the obturator about an axis of rotation and to simultaneously translate the obturator vertically in a direction along the axis of rotation while the obturator is supported by the trunnion comprises temporarily opening or closing the valve.

20. The method of claim 15, wherein rotating the valve stem to rotate the obturator about an axis of rotation and to simultaneously translate the obturator vertically in a direction along the axis of rotation while the obturator is supported by the trunnion comprises translating the obturator without disconnecting the adjustable trunnion valve from an adjacent flow conduit.

\* \* \* \* \*